(12) United States Patent
Olsen

(10) Patent No.: US 8,689,959 B2
(45) Date of Patent: Apr. 8, 2014

(54) CLUTCH ASSEMBLY FOR HYBRID TRANSMISSION

(75) Inventor: Steven Olsen, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 315 days.

(21) Appl. No.: 13/223,596

(22) Filed: Sep. 1, 2011

(65) Prior Publication Data

US 2012/0067688 A1 Mar. 22, 2012

Related U.S. Application Data

(60) Provisional application No. 61/383,997, filed on Sep. 17, 2010.

(51) Int. Cl.
*F16D 13/50* (2006.01)

(52) U.S. Cl.
USPC .................................. 192/70.27; 192/89.24

(58) Field of Classification Search
USPC ......... 192/89.22–89.24, 70.13, 85.51, DIG. 1
See application file for complete search history.

(56) References Cited

U.S. PATENT DOCUMENTS

| | | | | | |
|---|---|---|---|---|---|
| 2,229,319 | A | * | 1/1941 | Wesselhoff | 192/70.17 |
| 5,957,259 | A | * | 9/1999 | Teramae | 192/70.19 |
| 7,686,147 | B2 | * | 3/2010 | Friedmann et al. | 192/48.8 |
| 2003/0164274 | A1 | * | 9/2003 | Feldhaus et al. | 192/48.8 |

\* cited by examiner

*Primary Examiner* — Richard M. Lorence
(74) *Attorney, Agent, or Firm* — Lucas & Mercanti, LLP

(57) ABSTRACT

A fully contained, drop-in clutch assembly, which includes a clutch cover which has slots, a moveable pressure plate with radially outwardly directed tabs that engages the slots of the clutch allowing axial movement, a fixed pressure plate which is fastened to the clutch cover by fastening elements, a clutch disc disposed between the movable pressure plate and the fixed pressure plate, and a diaphragm spring. By fastening the fixed pressure plate to the clutch cover, the clutch assembly is fully contained, allowing easy assembly to transmission housing and a flexplate.

11 Claims, 2 Drawing Sheets

CLUTCH ASSEMBLY FOR HYBRID TRANSMISSION

This application claims the priority of U.S. 61/383,997 filed Sep. 17, 2010, which is incorporated by reference herein.

FIELD OF INVENTION

The present invention relates to clutch assemblies used to connect power producing devices to hybrid transmissions.

BACKGROUND OF THE INVENTION

Clutches built into a rotating housing in a transmission are known. However, due to the numerous components of clutches, the clutch can easily be misassembled in the housing. Moreover, considerable machining to position the clutch components such as the keys, support surfaces, snap-ring grooves is required. The snap rings must be able to support the clutch to apply loads. This allows considerable deflection of the pressure plate and could cause uneven contact on the friction material of the clutch discs. Moreover, there are no known provisions for ensuring lift-off of the clutch plates.

SUMMARY OF THE INVENTION

The invention is directed to fully contained drop-in clutch assemblies requiring only attachment to a transmission housing during final assembly of the power producing device using bolts. In one embodiment, the clutch assembly connects an internal combustion engine and an integrated starter unit to the transmission. In another embodiment, the clutch assembly connects a traction motor to a transmission.

Broadly, the invention can be defined as a clutch assembly for connecting a power producing device to a transmission, which comprises a clutch cover that has slots, a moveable pressure plate that has radially outwardly directed tabs which engage the slots of the clutch cover, a fixed pressure plate which is fastened to the clutch cover by fastening elements, ensuring the assembly is fully contained, a clutch disc disposed between the movable pressure plate and the fixed pressure plate, and a diaphragm spring arranged within the clutch cover.

In one aspect of the invention, in a free state, the diaphragm spring can urge the moveable pressure plate away from the fixed pressure plate. Here, the clutch assembly can further comprise a first retaining member, which can be a rivet or a radial inward protrusion formed in the clutch cover, to secure an outer circumferential edge of the diaphragm spring within the clutch cover. Additionally, a wire ring or a steel stamping can be arranged between the moveable pressure plate and the diaphragm spring. Moreover, a second retaining member, which can be a spring clip, can secure the diaphragm spring and the wire ring to the moveable pressure plate.

In another aspect of the invention, in a free state, the diaphragm spring can urge the moveable pressure plate towards the fixed pressure plate and the movable pressure plate can have radially inwardly directed tabs. Here, the clutch assembly can further comprise a leaf spring which has a radially outwardly directed tab movably fastened to the movable pressure plate by fastening elements, such as spacer bolts. The radially outwardly directed tab of the leaf spring can be engagable with one of the radially inwardly directed tabs of the moveable pressure plate forming a non-rigid connection. Also, the clutch assembly can further comprise a first wire ring and a second wire ring. The first wire ring can be arranged between the moveable pressure plate and the diaphragm, and the second wire ring can be supported on the leaf spring with the diaphragm spring being pivotable on the second wire ring.

Alternatively, the invention can be defined as a clutch assembly, which is normally open, for connecting a power producing device to a transmission that comprises a clutch cover which has slots, a moveable pressure plate which has radially outwardly directed tabs that engage the slots of the clutch cover, a fixed pressure plate which is fastened to the clutch cover by fastening elements, ensuring the assembly is fully contained, a clutch disc disposed between the movable pressure plate and the fixed pressure plate, a diaphragm spring which urges the moveable pressure plate away from the fixed pressure plate, and a first retaining member, such as a rivet or a radial inward protrusion formed in the clutch cover, which secures an outer circumferential edge of the diaphragm spring within the clutch cover.

The clutch assembly can further comprise a wire ring or a steel stamping arranged between the moveable pressure plate and the diaphragm spring.

Moreover, a second retaining member, such as a spring clip, can secure the diaphragm spring and the wire ring to the moveable pressure plate.

Alternatively, the invention can be defined as a clutch assembly, which is normally closed, for connecting a power producing device to a transmission that comprises a clutch cover which has slots, a moveable pressure plate which has radially outwardly directed tabs and radially inwardly directed tabs with the radially outwardly directed tabs engaging the slots of the clutch cover, a fixed pressure plate which is fastened to the clutch cover by fastening elements, ensuring the assembly is fully contained, a clutch disc disposed between the movable pressure plate and the fixed pressure plate, and a diaphragm spring which urges the moveable pressure plate towards the fixed pressure plate. The clutch assembly can also comprise a leaf spring which has a radially outwardly directed tab that is movably fastened to the movable pressure plate by fastening elements, such spacer bolts. The radially outwardly directed tab of the leaf spring can be engagable with one of the radially inwardly directed tabs of the moveable pressure plate forming a non-rigid connection to pull the moveable pressure plate away from the clutch discs. Furthermore, the clutch assembly can comprise a first wire ring and a second wire ring. The first wire ring can be arranged between the moveable pressure plate and the diaphragm spring with the diaphragm spring being pivotable on the wire ring and the second wire ring can be supported on the leaf spring.

BRIEF DESCRIPTION OF THE DRAWINGS

The elements of the invention will be further understood and appreciated by reading the following description in conjunction with the accompanying drawings, in which.

DETAILED DESCRIPTION OF THE INVENTION

Figure 1:
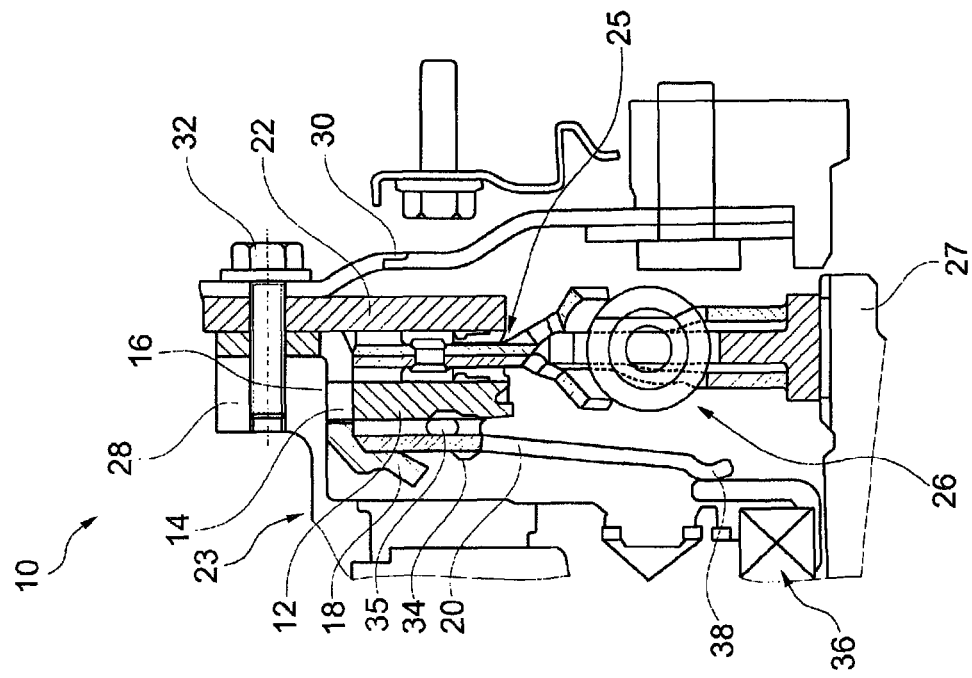
FIG. 1 is a cross-sectional view of a first clutch embodiment.

FIG. 1 illustrates a normally-open first clutch assembly 10. The clutch assembly 10 has a moveable pressure plate 12, which can be stamped or cast, with radially outwardly directed tabs 14 that engage slots 16 in a clutch cover 18, allowing axial movement. Also, the clutch assembly 10 includes a diaphragm spring 20 that is biased to pull the moveable pressure plate 12 away from a clutch disc 25, which is disposed between the movable pressure plate 12 and a fixed pressure plate 22, thereby opening the clutch. Furthermore, a first retaining member 23 is used to hold the outer circumferential edge of the diaphragm spring 20 against or within the clutch cover 18. The first retaining member 23 can, but is not limited to include a rivet or a radial inward protrusion formed in the clutch cover 18. Additionally, the fixed pressure plate 22, which can be stamped or cast and which opposes the moveable pressure plate 12, is fastened to the clutch cover 18 by fasteners 24 (see, FIG. 3) thereby ensuring the assembly is fully contained. The fasteners 24 can include, but are not limited to, rivets, bolts, and screws.

As shown in FIG. 1, a wire ring 35, which acts as a pivot between the moveable pressure plate 12 and the diaphragm spring 20, can be incorporated into the clutch assembly 10. Alternatively, steel stampings can be used in place of the wire ring 35. When the pressure plate 12 is stamped, the wire ring 35 rests in a coined groove. Additionally, a second retaining member 34, such as a spring clip, could be incorporated into the clutch assembly 10. The second retaining member 34 would ensure the moveable pressure plate 12 and the diaphragm spring 20 remain in contact with the wire ring 35, and pulls the moveable pressure plate 12 away from the fixed pressure plate 22. Furthermore, the clutch assembly 10 may include a torsional isolator 26 to help isolate firing irregularities of the internal combustion engine from a transmission input shaft 27.

Since the clutch assembly 10 is open by default, the diaphragm spring 20 is preloaded to urge the movable pressure plate 12 axially away from the fixed pressure plate 22 until acted upon by an outside force. The clutch of the clutch assembly 10 can be applied using a "throw-out bearing" 36 which contacts fingers 38 of the diaphragm spring 20 to apply pressure via the lever arm of the diaphragm spring 20 to the moveable pressure plate 12 (forcing the diaphragm spring to the right as shown in FIG. 1). When acted upon, the diaphragm spring 20 pivots about its outer diameter against the first retaining member 23 and applies an axial force (to the right as shown in FIG. 1) via the wire ring to the moveable pressure plate 12 to clamp the clutch disc 25 between the moveable pressure plate 12 and the fixed pressure plate 22 and engage the clutch. The throw-out bearing 36 has enough travel and applies enough force, which is increased by the lever arm of the diaphragm spring 20, for the moveable pressure plate 12 and fixed pressure plate 22 to transmit the required torque to the clutch disc 25.

Once manufacture is complete, the clutch assembly 10 allows for easy transportability and assembly by a customer. Upon minor modification to a rotatable transmission housing 28 and a flexplate 30 to provide clearance for the fasteners the customer only needs to fasten the completed clutch assembly 10 to the flexplate 30 and transmission housing 28 using existing bolts 32. No further assembly steps are required.

Figure 2:
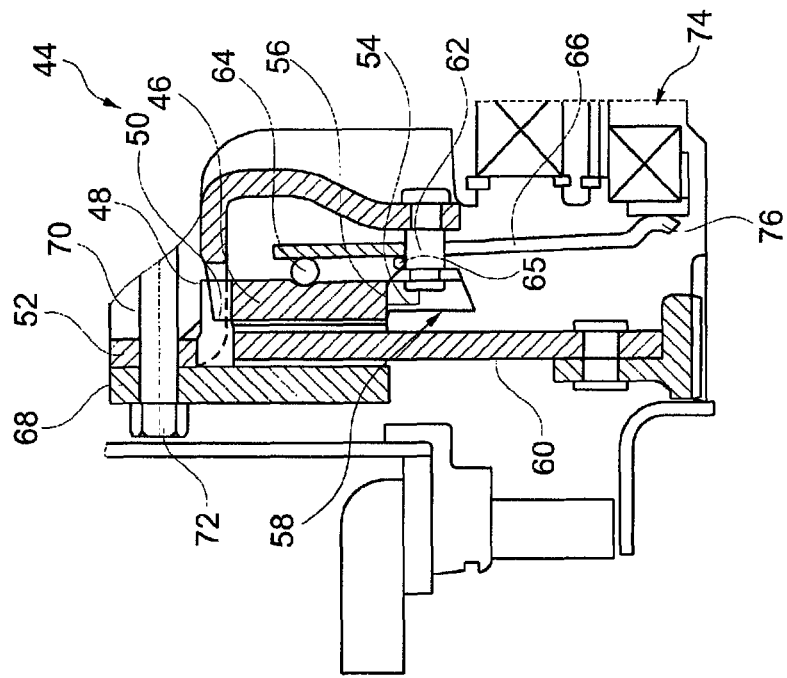
FIG. 2 is a cross-sectional view of a second clutch embodiment.

FIG. 2 illustrates a normally-closed second clutch assembly 44. The clutch assembly 44 has a moveable pressure plate 46 and a fixed pressure plate 68, which can each be stamped or cast. The fixed pressure plate 68 opposes the moveable pressure plate 46 and is fastened to a clutch cover 52. The moveable pressure plate 46 has radially outwardly directed tabs 48 which drivingly engage slots 50 in the clutch cover 52, allowing axial movement, and radially inwardly directed tabs 54, which substantially oppose the radially outwardly directed tabs 48. The radially inwardly directed tabs 54 are each engagable with a tab 56 (best viewed in FIG. 4) of a leaf spring 58 to disengage the clutch by pulling the moveable pressure plate 46 away from a clutch disc 60, which is disposed between the movable pressure plate 46 and a fixed pressure plate 68. The leaf springs 58 are each attached to the clutch cover 52 by a spacer bolt 62. The tabs 56 of the leaf springs 58, which are located axially adjacent of the radially inwardly directed tabs 54 of the movable pressure plate 46, do not transmit torque. However, the interaction of the radially inwardly directed tabs 54 of the movable pressure plate 46 and the tabs 56 of the leaf springs 58 prevent a rigid connection between the leaf spring 58 and the movable pressure plate 46, allowing for slight circumferential motion of the moveable pressure plate 46 relative to the leaf spring 58.

Additionally, a first wire ring 64 and a second wire ring 65 are incorporated into the clutch assembly 44. The first wire ring 64 acts as a pivot between the moveable pressure plate 46 and the diaphragm spring 66. The second wire ring 65 acts as a pivot between the leaf spring 58 and the diaphragm spring 66. The spacer bolt 62 and the leaf spring 58 support the second wire ring 65 and the second wire ring 65 supports the clutch release load. When the moveable pressure plate 46 is stamped, the first wire ring 64 rests in a coined groove. Alternatively, steel stampings can be used in place of the first wire ring 64.

Since the clutch assembly 44 is closed by default, the diaphragm spring 66 is preloaded to urge the movable pressure plate 46 towards the fixed pressure plate 68 until acted upon by an outside force. The clutch of the clutch assembly 44 can be disengaged using a "throw-out bearing" 74 to release the pressure applied to the moveable pressure plate 46 by the diaphragm spring 66. To release the pressure applied by the diaphragm spring 66, the throw out bearing 74 contacts fingers 76 of the diaphragm spring 66 (forcing the fingers 76 to the left as shown in FIG. 2). The contact by the throw out bearing 74 on the fingers 76 of the diaphragm spring 66 forces the diaphragm spring 66 to pivot about the second wire ring 65 and reduce the axial force applied to the movable pressure plate 46 through the first wire ring 64. The leaf springs 58 apply an axial force on the movable pressure plate 46 to pull the movable pressure plate 46 away from the fixed pressure plate 68 (to the right as shown in FIG. 2) to unclamp the clutch disc 60 and release the clutch.

As with the assembly shown in FIG. 1, upon completion of manufacture, the clutch assembly 44 allows for easy transportability and assembly by a customer. Upon minor modification to a rotatable transmission housing 70, the customer only needs to fasten the completed clutch assembly 44 to the transmission housing 70 using existing bolts 72. No further assembly steps are required.

Figure 3:
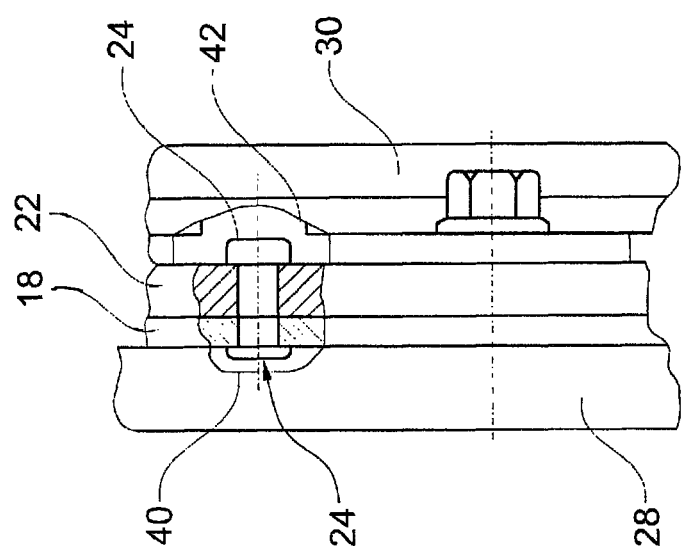
FIG. 3 is a top view of FIG. 1.

FIG. 3 illustrates a detail of the clutch assembly 10 with the fixed pressure plate 22 fastened to the clutch cover 18. The clutch assembly 10 is shown in an installed state between the transmission housing 28 and the flexplate 30. Respective recesses 40, 42 in the transmission housing 28 and the flexplate 30 provide clearance for the fastening element 24 of the clutch assembly 10.

Figure 4:
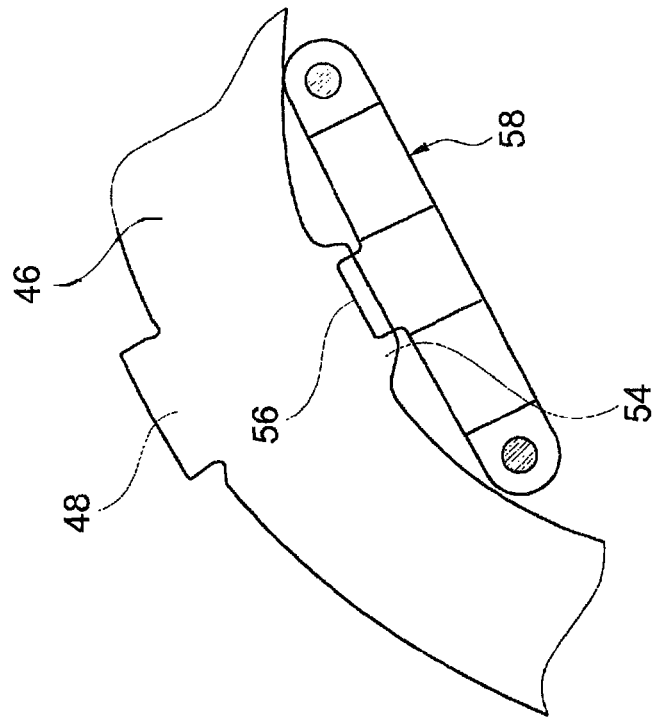
FIG. 4 is a sectional view of the diaphragm spring and leaf spring of FIG. 2.

FIG. 4 illustrates a detail of the clutch assembly 44 with the tab 56 of the leaf spring 58 engaging the radially inwardly directed tab 54 of the moveable pressure plate 46

The invention has been described with reference to preferred embodiments. It should be understood that the scope of the invention is defined by the claims and is not intended to be limited to the specific embodiments disclosed herein.

REFERENCE CHARACTERS

10 First Clutch Assembly
12 Moveable Pressure Plate

14 Radial Tabs
16 Slots
18 Clutch Cover
20 Diaphragm Spring
22 Fixed Pressure Plate
23 First Retaining Member
24 Fastener
25 Clutch Disc
26 Torsional Isolator
27 Transmission Input Shaft
28 Transmission Housing
30 Flexplate
32 Bolts
34 Second Retaining Member
35 Wire Ring
36 Throw-out Bearing
38 Contact Fingers
40 Recesses
42 Recesses
44 Second Clutch Assembly
46 Moveable Pressure Plate
48 Tab
50 Slots
52 Clutch Assembly
54 Tab
56 Tab
58 Leaf Spring
60 Clutch Disc
62 Spacer Bolt
64 First Wire Ring
65 Second Wire Ring
66 Diaphragm Spring
68 Fixed Pressure Plate
70 Transmission Housing
72 Bolt
74 Throw-out Bearing
76 Contact Fingers

What is claimed:

1. A clutch assembly for connecting a power producing device to a transmission, comprising:
   a clutch cover having slots;
   a moveable pressure plate having radially outwardly directed tabs engaging the slots of the clutch cover;
   a fixed pressure plate fastened to the clutch cover by fastening elements, ensuring the assembly is fully contained;
   a clutch disc disposed between the movable pressure plate and the fixed pressure plate; and
   a diaphragm spring arranged within the clutch cover, wherein, in a free state, the diaphragm spring urges the moveable pressure plate away from the fixed pressure plate.

2. The clutch assembly of claim 1, further comprising a first retaining member which secures an outer circumferential edge of the diaphragm spring within the clutch cover.

3. The clutch assembly of claim 2, wherein the first retaining member is a rivet or a radial inward protrusion formed in the clutch cover.

4. The clutch assembly of claim 2, further comprising a wire ring or a steel stamping arranged between the moveable pressure plate and the diaphragm spring.

5. The clutch assembly of claim 4, further comprising a second retaining member, which secures the diaphragm spring and the wire ring to the moveable pressure plate.

6. The clutch assembly of claim 5, wherein the second retaining member is a spring clip.

7. A clutch assembly, which is normally open, for connecting a power producing device to a transmission, comprising:
   a clutch cover having slots;
   a moveable pressure plate having radially outwardly directed tabs engaging the slots of the clutch cover;
   a fixed pressure plate fastened to the clutch cover by fastening elements, ensuring the assembly is fully contained;
   a clutch disc disposed between the movable pressure plate and the fixed pressure plate;
   a diaphragm spring urging the moveable pressure plate away from the fixed pressure plate; and a first retaining member securing an outer circumferential edge of the diaphragm spring within the clutch cover.

8. The clutch assembly of claim 7, wherein the first retaining member is a rivet or a radial inward protrusion formed in the clutch cover.

9. The clutch assembly of claim 7, further comprising a wire ring or a steel stamping arranged between the moveable pressure plate and the diaphragm spring.

10. The clutch assembly of claim 9, further comprising a second retaining member, which secures the diaphragm spring and the wire ring to the moveable pressure plate.

11. The clutch assembly of claim 10, wherein the second retaining member is a spring clip.

* * * * *